US008422370B2

(12) United States Patent
Accapadi et al.

(10) Patent No.: US 8,422,370 B2
(45) Date of Patent: Apr. 16, 2013

(54) REDUCING RETRANSMISSION OF OUT OF ORDER PACKETS

(75) Inventors: Jos M. Accapadi, Austin, TX (US); Andrew Dunshea, Austin, TX (US); Gary L. Nevling, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 12/163,064

(22) Filed: Jun. 27, 2008

(65) Prior Publication Data

US 2009/0323527 A1 Dec. 31, 2009

(51) Int. Cl.
*H04J 1/16* (2006.01)

(52) U.S. Cl.
USPC ............................ 370/235; 370/229; 370/234

(58) Field of Classification Search .......... 370/229–235, 370/282, 386, 249, 437, 252, 401, 400, 389
See application file for complete search history.

(56) References Cited

U.S. PATENT DOCUMENTS

| 4,633,462 | A | * | 12/1986 | Stifle et al. ................... 370/448 |
| 5,280,477 | A | | 1/1994 | Trapp |
| 6,018,516 | A | | 1/2000 | Packer |
| 6,359,888 | B1 | | 3/2002 | Koch et al. |
| 6,741,603 | B2 | | 5/2004 | Pate et al. |
| 7,065,482 | B2 | * | 6/2006 | Shorey et al. ................. 709/224 |
| 7,099,273 | B2 | * | 8/2006 | Ha et al. ........................ 370/229 |
| 7,126,917 | B2 | * | 10/2006 | Harris et al. .................. 370/235 |
| 7,251,246 | B2 | | 7/2007 | Ross |
| 7,613,976 | B2 | * | 11/2009 | Ludwig et al. ............... 714/748 |
| 2002/0031126 | A1 | | 3/2002 | Crichton et al. |
| 2004/0071096 | A1 | * | 4/2004 | Na et al. ........................ 370/252 |
| 2005/0018668 | A1 | | 1/2005 | Cheriton |
| 2006/0039283 | A1 | * | 2/2006 | Sturrock et al. ............... 370/235 |
| 2007/0201503 | A1 | * | 8/2007 | Nishio .......................... 370/437 |

* cited by examiner

*Primary Examiner* — Kevin C Harper
*Assistant Examiner* — Samina Choudhry
(74) *Attorney, Agent, or Firm* — Stephen R. Tkacs; Stephen J. Walder, Jr.; David A. Mims, Jr.

(57) ABSTRACT

A mechanism is provided to determine an average rate of duplicate packets per connection for packets received by a node over an interface. The mechanism selects a connection from the connections established over the interface, determines that a rate of duplicate packets for the selected connection exceeds the average rate of duplicate packets by a threshold percentage, and sends a message to a transmitter of the duplicate packets over the connection to increase a timeout interval to retransmit packets.

20 Claims, 5 Drawing Sheets

REDUCING RETRANSMISSION OF OUT OF ORDER PACKETS

BACKGROUND OF THE INVENTION

The present invention is in the field of network communications. More particularly, the present invention relates to methods and arrangements for reducing retransmission from out of order packets.

In one form of network communications, two nodes may set up a connection. The two nodes may communicate beforehand to decide on the parameters for the connection. Once the connection is established, they may maintain status information about the connection. The status information may include data about sockets, sequence numbers of data sent over the connection, and the amount of data that may be contained in a single transmission. Data sent over a network may be divided into small portions called packets. The packets may consist of the data and header information.

Some connections attempt to be reliable, to insure that all packets transmitted by the sender reach the receiver. In these connections, the receiver may send an acknowledgement (ACK) to the transmitter when it receives a packet. In turn, the transmitter may retransmit a packet if it does not receive an ACK for the packet within a certain period of time (a retransmission timeout interval or RTO). Reliable connections may also include some form of error checking.

Transmission Control Protocol (TCP) is a standard transport-level protocol that utilizes reliable connections. Many application protocols use TCP, including SMTP (simple mail transfer protocol); HTTP, used for the web; POP3, for email retrieval; Telnet, and FTP. TCP may provide a data stream transfer between two processes. Bytes of data are divided into packets called segments. The bytes are numbered sequentially. An ACK for a segment references the sequence number of the next byte of data not yet delivered. For example, if a node receives a segment containing bytes 0 through 49, it would transmit an ACK referring to byte 50. If the receiver receives segments out of order, it continues to send ACKs referring to a missing segment. In the previous example, if the receiver then received a segment with bytes 100 through 149, it would respond with another ACK referring to byte 50, because the segment containing that byte had still not arrived. Under the protocol, a sender may not be sure exactly what packets have been received. If the sender had also sent out a segment with bytes 150 through 199, the sender may not be able to determine whether the receiver had received the segment with bytes 100 through 149 or the segment with bytes 150 through 199.

TCP implementations may provide a variety of algorithms for determining an RTO. In one version, the RTO may be based upon an estimated time for a round trip journey (RTT) of a segment from the sender to the receiver and an ACK back to the sender. The transmitter may estimate the RTT by measuring the time from sending a segment to the time of receiving an acknowledgement. In one version, a TCP implementation maintains an estimated RTT, EstimatedRTT, and continually updates it with a current or SampleRTT. Each time the implementation sends a data segment and receives an ACK, it measures the difference in time as the SampleRTT. It then updates the EstimatedRTT by the iterative formula:

$$EstimatedRTT = \alpha \times EstimatedRTT + (1-\alpha) \times SampleRTT.$$

$\alpha$ is a parameter to weight the contributors to the updated value. In many implementations, $\alpha$ is a value between 0.8 and 0.9. Given EstimatedRTT, RTO is calculated by:

$$RTO = 2 \times EstimatedRTT$$

Another algorithm is similar, but reacts to timeouts more conservatively. Each time there is a timeout, the new RTO is set to twice the previous one:

$$RTO = 2 \times RTO.$$

In yet another version, the setting of the RTO after a timeout depends upon the variance of the round trip times. If the variance is small, the change in value of the RTO may be small. If the variance is large, however, the change in value of the RTO may be larger. This algorithm is as follows:

$$Difference = SampleRTT - EstimatedRTT$$

$$EstimatedRTT = EstimatedRTT + (\delta \times Difference)$$

$$Deviation = Deviation + \delta(|Difference| - Deviation)$$

$$RTO = \mu \times EstimatedRTT + \phi \times Deviation$$

Here, $\delta$ is value between 0 and 1, $\mu$ may be set to 1 and $\phi$ is often set to 4. When the variance is small, the new value of RTO may be approximately equal to the old value. When the variance is large, the value of the second summand of the last equation may dominate.

Some TCP implementations may retransmit a segment even before the RTO for the segment has expired. In the fast retransmit procedure, the implementation may retransmit a segment after receiving duplicate ACKs indicating that the segment is missing. For example, a TCP implementation may send out segments 1 through 4 ending with bytes 49, 99, 149, and 199. It may then receive 3 ACKs referring to byte 50 of segment 2 as the next expected byte. The implementation may determine that the segment 2 was lost, because the two segments sent afterwards arrived. It may then retransmit segment 2 even before expiration of the RTO for segment 2. In many implementations, fast retransmit is executed upon receiving a third duplicate ACK for a segment.

BRIEF SUMMARY OF THE INVENTION

The problems identified above are in large part addressed by methods and arrangements of network communications. One embodiment provides a method of determining an average rate of duplicate packets per connection for packets received by a node over an interface. The method may involve selecting a connection from the connections established over the interface, determining that a rate of duplicate packets for the selected connection exceeds the average rate of duplicate packets by a threshold percentage, and sending a message to a transmitter of the duplicate packets over the connection to increase a timeout interval to retransmit packets. Another embodiment may provide an apparatus for increasing a timeout interval to retransmit packets. Still another embodiment may provide a computer program product for increasing a timeout interval to retransmit packets.

BRIEF DESCRIPTION OF THE SEVERAL VIEWS OF THE DRAWINGS

Advantages of the invention will become apparent upon reading the following detailed description and upon reference to the accompanying drawings in which like references may indicate similar elements.

DETAILED DESCRIPTION OF THE INVENTION

Figure 1:
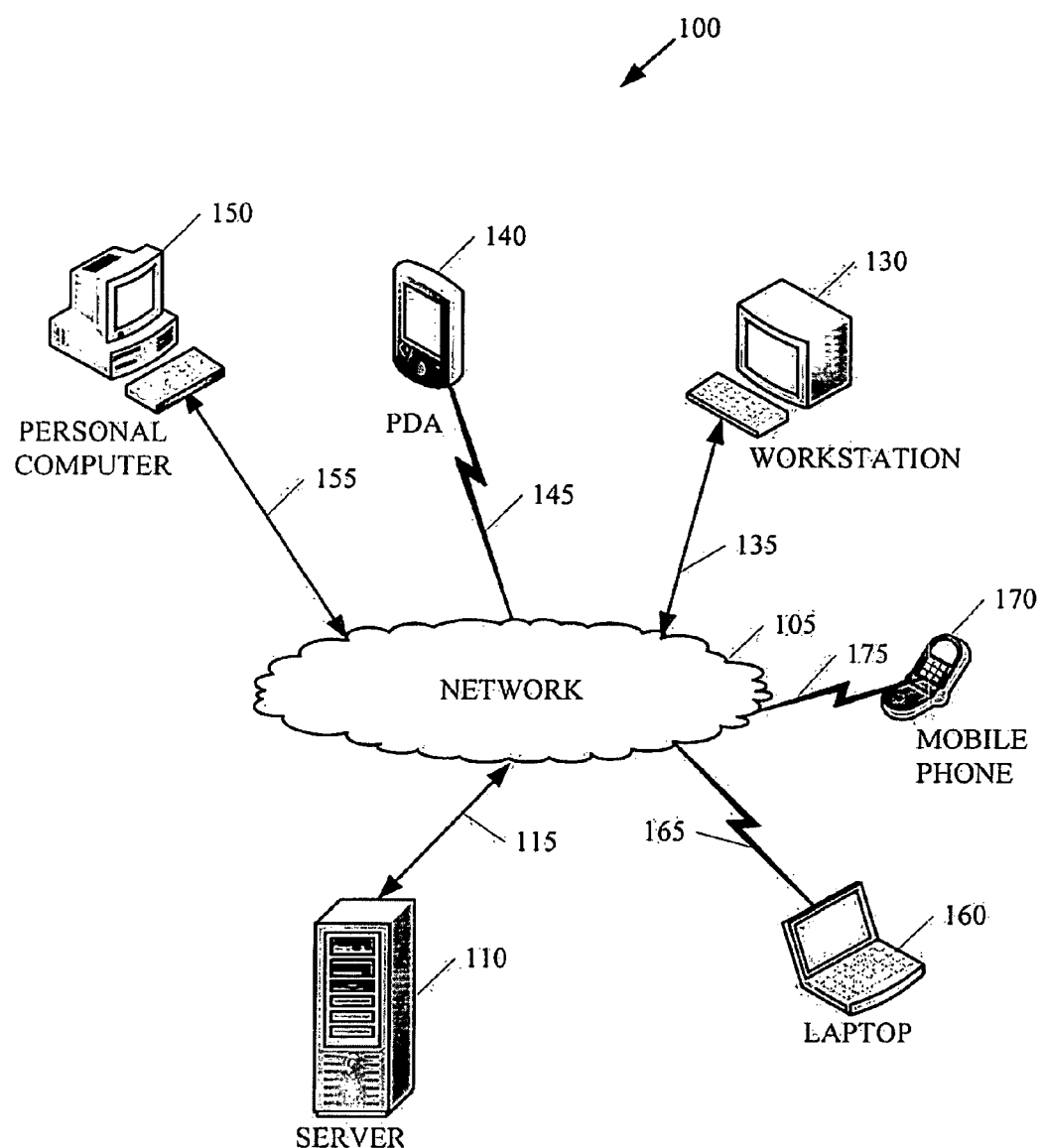
FIG. 1 depicts a diagram of an embodiment of a networked system of devices that may increase a timeout interval to retransmit packets (RTO) over connections with a rate of duplicate packets that exceed an average rate by a threshold percentage.

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of network communications are contemplated. Embodiments include transformations, code, state machines or other logic for network communications. One embodiment provides a method of determining an average rate of duplicate packets per connection for packets received by a node over an interface. The method may involve selecting a connection from the connections established over the interface, determining that a rate of duplicate packets for the selected connection exceeds the average rate of duplicate packets by a threshold percentage, and sending a message to a transmitter of the duplicate packets over the connection to increase a timeout interval to retransmit packets.

In many embodiments, a module such as an operating system that implements a communications protocol may insert a field into a connection oriented table to record the duplicate packets per connection. On a per interface basis, the module may look at the average number of duplicate packets per connection over a period of time. The module may then select a specific connection or a minimum number of connections to monitor. The module may introduce a tunable that would allow an adjustment on the specific connection or connections with the most duplicates. In some embodiments, the module may repeat this examination of connections over subsequent periods until it obtains an acceptable threshold for duplicate packets and network throughput.

The module may compare the number of duplicate packets per time period for each of the selected connections of an interface during a time period with the system wide average for the interface. The module may increase the fast timeout values for those connections whose duplicate packets exceed the average of duplicate packets for connections over the interface by a sufficient percentage. The percentage may vary depending upon the connection. In some embodiments, the fast timeout interval may be doubled. The increase may be tunable. Connections that have fewer duplicate packets could potentially have their timeout values reduced rather than increased.

While specific embodiments will be described below with reference to particular circuit or logic configurations, those of skill in the art will realize that embodiments of the present invention may advantageously be implemented with other substantially equivalent configurations.

FIG. 1 depicts a diagram of an embodiment of a networked system 100 of devices that may increase a timeout interval to retransmit packets over connections with a rate of duplicate packets that exceed an average rate by a threshold percentage. The system 100 includes a network 105, server 110 connected to network 105 through wireline connections 115, and a variety of other devices capable of increasing an RTO (hosts), including:

workstation 130, a computer coupled to network 105 through wireline connection 135, personal digital assistant 140, coupled to network 105 through wireless connection 145, personal computer 150, coupled to network 105 through wireline connection 155, laptop computer 160, coupled to network 105 through wireless connection 165; and mobile phone 170, coupled to network 105 through wireless connection 175.

Network 105, which may consist of the Internet or another wide area network, a local area network, or a combination of networks, may provide data communications among server 110 and the hosts 130, 140, 150, 160, and 170. Server 110 may run software to respond to requests from a client over a network. Examples include web servers which may generate content and communicate with visitors to web sites and communications servers which may receive requests to transmit or deliver messages over the network.

Pursuant to a variety of communications protocols, processes running in hosts 130, 140, 150, 160, and 170 may communicate over network 105 with processes in other hosts or in server 110. Under the communications protocols, the messages may be broken up into packets. The communications protocols may provide that the receiver of a packet or other portion of a message responds with an acknowledgement (ACK). A sender may retransmit a packet if the ACK is not received after a retransmission timeout interval (RTO).

The arrangement of server 110 and hosts 130, 140, 150, 160, and 170 making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Some embodiments may include additional servers to communicate with each other.

Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
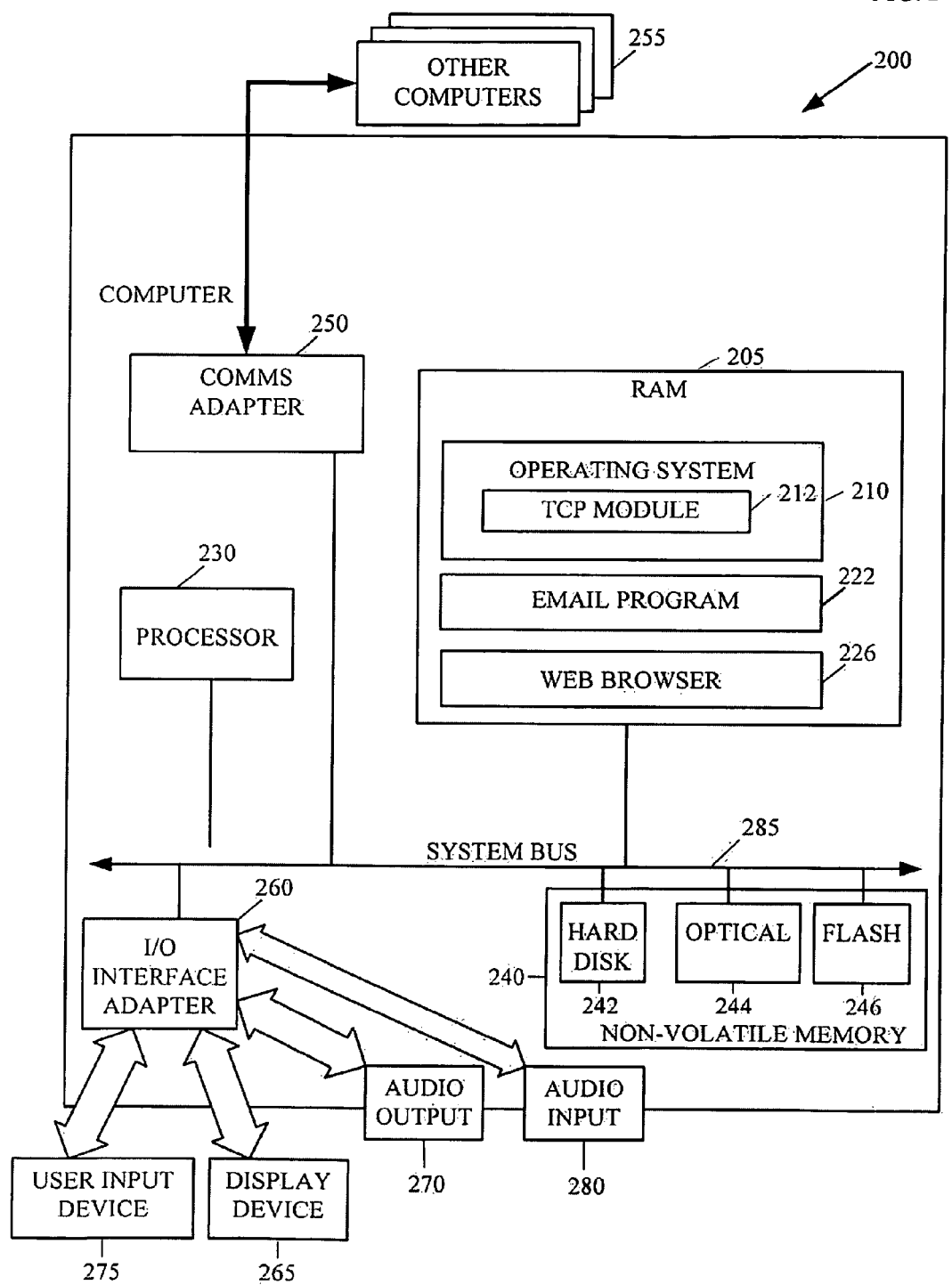
FIG. 2 depicts a computer capable of network communications in accordance with embodiments of the invention.

FIG. 2 depicts an embodiment of a computer 200 that may increase an RTO over connections with a rate of duplicate packets that exceed an average rate by a threshold percentage in accordance with embodiments of the invention. Computer 200 includes random access memory (RAM) 205, a processor 230 or CPU, non-volatile memory 240, a communications adapter 250, and an Input/Output (I/O) interface adapter 260 connected by system bus 285. Stored in RAM 205 is operating system 210, email program 222, and web browser 226. Operating system 210 is a layer of system software that may make system resources, including memory access, access to input/output resources, and access to processors, available to other programs. Operating system 210 may also control allocation and authorization for access to computer resources. Operating systems may perform low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system.

Operating system 210 may implement the network protocols utilized by computer 200. Operating system 210 may make networking functions available to applications such as email program 222 and web browser 226 through an application programming interface (API). The API may consist of a set of networking commands that may be issued by an application program and performed by a networking module of operating system 210.

Operating system 210 includes TCP module 212. TCP module may administer network communications under the TCP protocol. Under TCP, processes executing in computer 200 may communicate with processes in other nodes on a network. The processes may be generated by application programs running on computer 200, such as email program 222 and web browser 226. TCP may maintain data about communications under the TCP protocol. The data may include a table describing the current TCP connections. One field of the table may be available to record the duplicate packets received over the current time period. The data in the field may be used to adjust an RTO for the connection. Operating systems useful in performing network communications include UNIX™, Linux™, Solaris™, Microsoft Windows XP™ and Vista™, AIX™, IBM's i5/OS™ and others as will occur to those of skill in the art.

Email program 222 may comprise computer program instructions for sending, receiving, and storing emails. Email program 222 may retrieve messages from a server using the POP3 protocol over a TCP/IP ((Internet Protocol) connection. Similarly, email program 222 may send mail to a server over the SMTP protocol via a TCP/IP connection. Web browser 226 may comprise computer program instructions to enable a user to retrieve and display information typically located on a Web page at a website on the World Wide Web or a local area network. Web browser 226 may communicate with web sites via the Hypertext Transfer Protocol (HTTP). Many implementations of HTTP utilize TCP/IP connections.

The modules shown in RAM 205 are for explanation, not for limitation. In other embodiments, modules other than an operating system may provide for network communications. In some other embodiments, data sent under network protocols other than TCP may be acknowledged, and the sender may resend data if an acknowledgement is not received within a certain time interval.

Operating system 210, email program 222, and web browser 226 are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications through which one computer sends data communications to other computers, such as other computers 255, directly or through a network. Communications adapter 250 may provide an interface to operating system 210 and other modules utilizing it. The interface may specify the form in which data is to be passed to the communications adapter, and the form in which data is received from the communications adapter.

The data communications may include transmitting and receiving email messages, and communicating with web pages through a web browser. Such data communications may be carried out serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, 802.11a/b/g/n adapters for wireless network communications, and mobile broadband cards.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other devices which communicate over a network may track duplicated packets per connection and may send a message to senders of the packets to increase an RTO. In other embodiments, modules to perform network communications may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
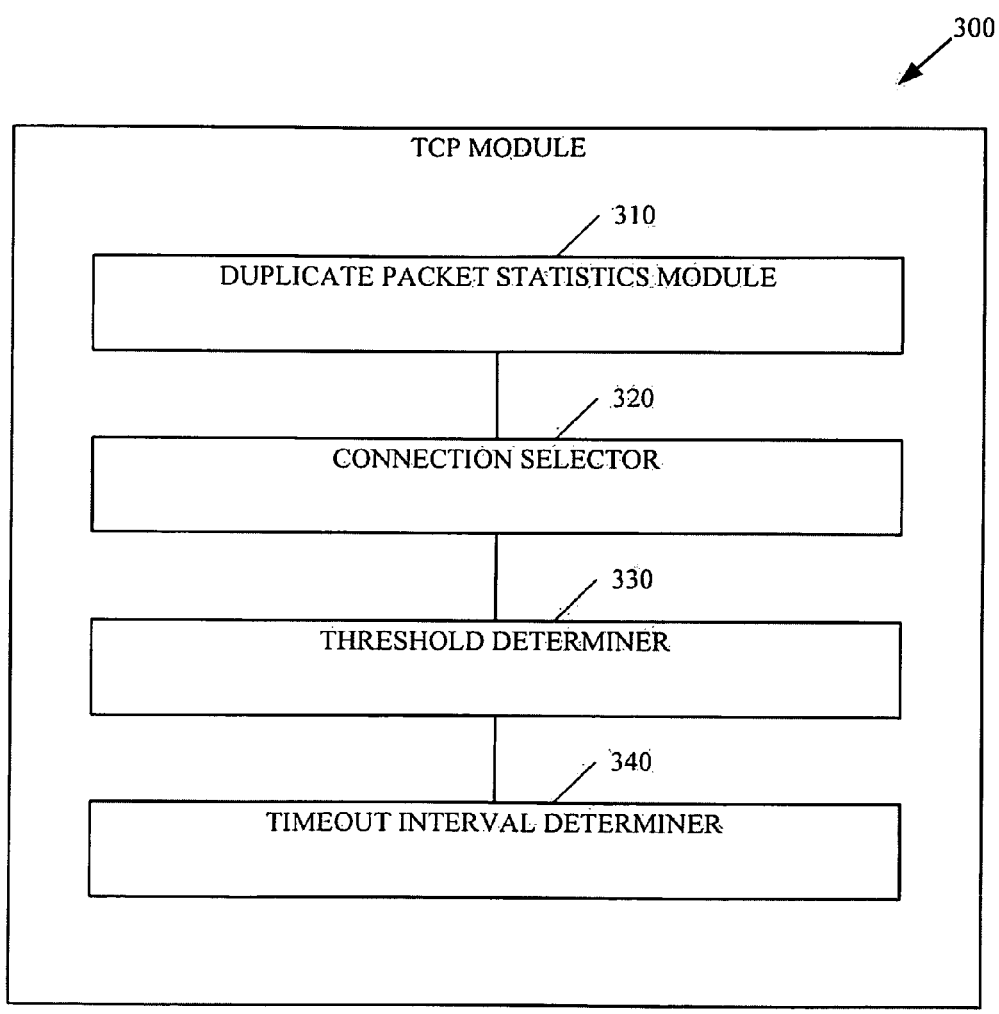
FIG. 3 depicts an apparatus capable of network communications in accordance with embodiments of the invention.

Turning to FIG. 3, illustrated is an embodiment of a TCP module 300 of a computing device that may implement communications pursuant to TCP. It may provide an API to processes for sending and receiving communications via TCP. The processes may issues commands pursuant to the API, and TCP module 300 may execute the commands, thereby carrying out the TCP communications. TCP module 300 may maintain tables about TCP connections. The tables may contain a field to describe duplicate packets per unit time for the connections. TCP module 300 may receive packets transmitted to a computing device from the network adapters of the computing device.

On a per interface basis, TCP module 300 may determine an average rate of duplicate packets received per connection. It may select one or more connections over the interfaces, determine that the rate of duplicate packets for each selected connection exceeds the average rate of duplicate packets over the interface used by the connection by a threshold percentage, and send a message to a transmitter of the duplicate packets over the connection to increase a timeout interval to retransmit packets.

TCP module 300 includes duplicate packet statistics module 310, connection selector 320, threshold determiner 330, and timeout interval determiner 340. Duplicate packet statistics module 310 may determine an average rate of duplicate number of packets per interface for a defined period of time. Duplicate packet statistics module 310 may select a period of time, such as 30 minutes. During the time period, duplicate packet statistics module 310 may receive from TCP module 300 data about the packets received under the TCP protocol. The data may be divided out for each interface for each communications adapter. Duplicate packet statistics module 310 may determine the average number of duplicate packets per connection for each interface. The average may take into account the duration during which the connections were opened during the period of time.

Connection selector 320 may also select one or more TCP connections to check for a high rate of duplicate packets. The connections may be specific connections, the connections with the highest amount of duplicate packets, or connections selected randomly. In some embodiments, connection selector 320 may select the connections automatically. In other embodiments, a system administrator may select the connections. In several embodiments, the selected connections may change over time. For instance, the selected connections may rotate so that over time, many of the long-standing connections may be checked. In some embodiments, a TCP module may provide a tunable that would that would allow an adjustment on the connections selected. Connection selector 320 may limit selections to connections over third generation networks such as fibre optics networks. In some instances of high latency in these networks, RTOs for connections over these networks may be too short, not providing sufficient time for the delivery of packets and their acknowledgement. As a result, packets may be retransmitted even though they had already been successfully transmitted.

Threshold determiner 330 may determine a threshold percentage above average for which to adjust RTOs. In some embodiments, the threshold may be fixed for all connections, such as 10% or 20%. For example, a message to adjust the RTO may be sent for any selected connection whose rate of duplicate packets is 10% or more over average. In other embodiments, threshold determiner 330 may base the threshold on the connection. For example, connections for sensitive information may have lower thresholds. The lower threshold may result in longer RTOs and less retransmission of packets. The reduction in retransmission may lower the chances of losing the sensitive data. In some embodiments, the threshold may be a tunable. A system administrator may set parameters to establish a threshold or thresholds.

Timeout interval determiner 340 may determine an RTO for transmission to the sender of packets. In some embodiments, the RTO may be based upon the deviation. For example, a timeout interval determiner 340 may request a 10% longer RTO for a connection with 10% more duplicated packets than average. In other embodiments, the recommended increase in the RTO may be a fixed percentage of the current value of the RTO. For example, timeout interval determiner 340 may recommend an RTO 20% or 100% longer than the previous RTO. In several embodiments, timeout interval determiner 340 may recommend one of a series of fixed RTOs. For example, it may recommend an RTO of 100, 150, 200, 250, or 300 ms, depending on which value is longer than the current RTO for a connection.

Figure 5B:
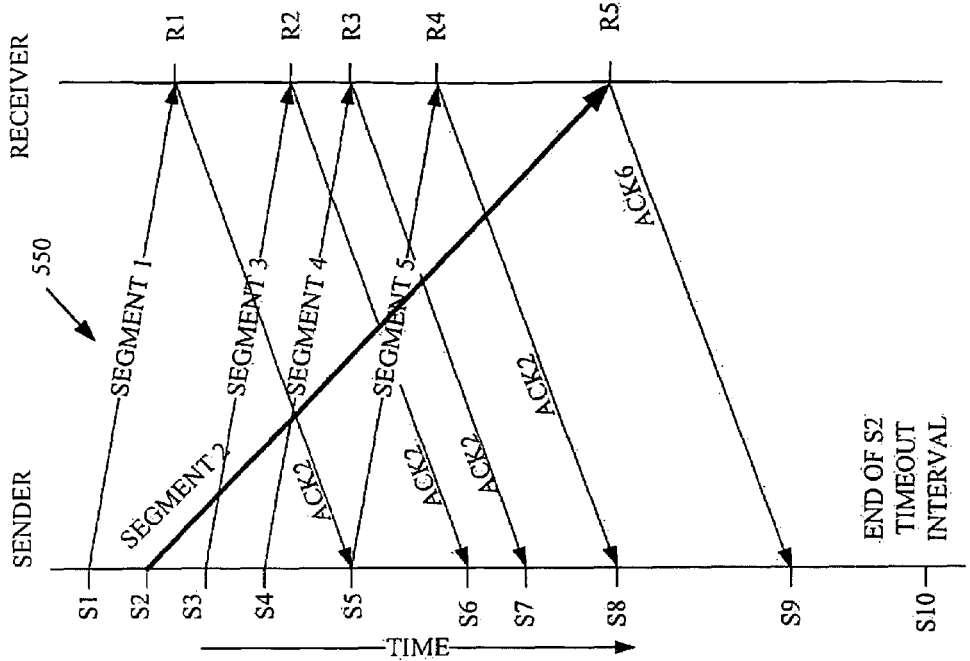
FIG. 5B sets forth an additional time line illustrating the transmission of segments and the receipt of ACKS in accordance with embodiments of the invention.
Figure 5A:
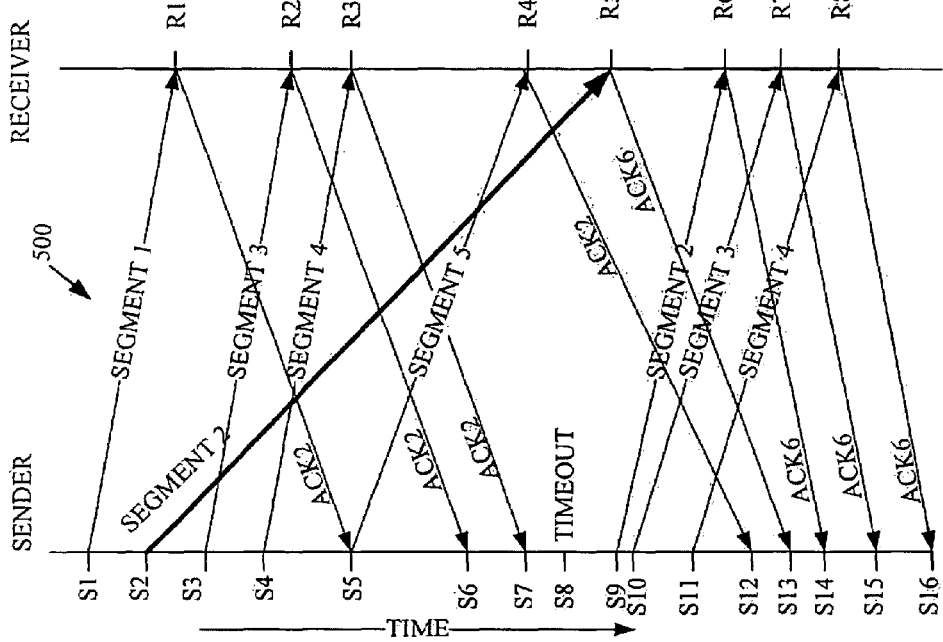
FIG. 5A sets forth a time line illustrating the transmission of segments and the receipt of ACKS in accordance with embodiments of the invention.

By increasing RTOs, some embodiments of a TCP module such as TCP module 300 may reduce network congestion by reducing the duplicate transmission of packets. Turning to FIGS. 5A and 5B, shown is an illustration of a hypothetical reduction in network transmissions by an increase in an RTO. Timing diagram 500 of FIG. 5A and timing diagram 550 of FIG. 5B illustrate the sending of packets from sender to receiver and the sending of ACKs from receiver to sender. In diagram 500, the timeout for the receipt of an acknowledgement for segment 2 expires before the acknowledgement is received, at S8. As a result, segments 2 through 4 are retransmitted, and the receiver must send acknowledgements of each of them. In diagram 550, the timeout interval is longer, and the acknowledgment for segment 2 is received before the timeout period expires. As a result, the duplicate transmissions do not occur.

In both diagrams, sender sends five successive packets or segments to receiver, at times S1 through S5, respectively. In both diagrams, the receiver receives segment 1 at time R1. Segment 2 is delayed. Segments 3 through 5 are received at times R2 through R4. Eventually, segment 2 arrives at time R5.

In both timing diagrams, the receiver sends ACKs for the segments immediately upon receipt of the segments, at times R1 for segment 1, R2 through R4 respectively for segments 3 through 5, and R5 for segment 2. The ACKs for segments 1 and 3 through 5 all reference segment 2, because that is the next segment expected by receiver. More precisely, the ACKs may reference the number of the first byte in segment 2, because that is the number of the next byte of data expected. The ACK for segment 2 references segment 6. Since segment 2 is received after segments 1, 3, 4, and 5, the next segment expected after its receipt is segment 6.

In both timing diagrams, the sender receives the ACKs for segments 1, 3 and 4 at times S5, S6, and S7 respectively. In diagram 500, the sender receives the ACK for segment 5 at time S12, and the ACK from segment 2 at time S13. In diagram 550, the sender receives the ACK for segment 5 at time S8 and the ACK for segment 2 at time S9.

In the example of diagram 500, the timeout for receipt of the ACK for segment 2 occurs at time S8, before the receipt at time S13. Accordingly, at time S9, the sender retransmits segment 2. In addition, at times S10 and S11, the sender retransmits segments 3 and 4. While the sender has received ACKs for two segments transmitted after segment 2, the sender may not know which segments the receiver received. The ACKs reference segment 2, not the segments that were received. In the implementation of the TCP protocol for the sender in diagram 500, the sender may choose to retransmit both of those segments. After the retransmissions of segments 2 through 4, the sender receives the delayed ACKS, at time S12 for segment 5 and at time S13 for segment 2.

In diagram 500, the receiver receives the repeated transmissions of segments 2 through 4 at times R6 through R8 and sends ACKs. The ACKs refer to segment 6, the next segment expected. The sender receives these ACKs at times S14 though S16.

In the example of diagram 550, the timeout period for the receipt of an ACK for segment 2 is longer than in diagram 500. The timeout would occur at time S10, later than the time S8 in diagram 500. As a result, in diagram 550, the sender receives an ACK for segment 2 before the expiration of the timeout period for receipt of the ACK. The receipt occurs at time S9, which is before time S10. Accordingly, there is no duplicate transmission of packets in diagram 550. In addition, there are no ACKs of the duplicate transmissions sent from the receiver to the sender. As a result, there are six fewer transmissions in diagram 550 than in diagram 500. In addition, the TCP module in FIG. 5B does not have to eliminate duplicates when reassembling the segments and passing the data up to the application layer.

Diagrams 500 and 550 may illustrate the operation of embodiments of the invention in some circumstances. Diagram 500 may represent transmissions over a connection for which the duplicate packets per period of time exceed the average by a threshold level. As a result, the receiver may send a message to the sender to increase the RTO. Diagram 550 may represent the same connection with an increased RTO. In the example of diagram 550, the increased RTO prevented the duplicate transmission of packets. The sender had time to receive the ACKs for the segments before expiration of the RTO, and did not need to retransmit them.

The examples of diagrams 500 and 550 are for illustration and not limitation. In some embodiments, a sender may retransmit only segments for which the timeout had expired. In those embodiments, the sender may retransmit only segment 2, and not segments 3 and 4. In a few embodiments, when segments are received out of order, the sender may identify one or more of the out of order packets. For example, in some embodiments, a receiver in circumstances similar to those of FIG. 5A may utilize a selective acknowledgement (SACK) field. In these embodiments, the receiver may list one or more segments received out of order in the field. In the example of FIG. 5A, the receiver may indicate in the SACK field that it had received segments 3 and 4. The sender would retransmit segment 2, but would not retransmit segments 3 and 4. In several embodiments, the sender may not send an ACK immediately upon receipt of a segment.

Figure 4:
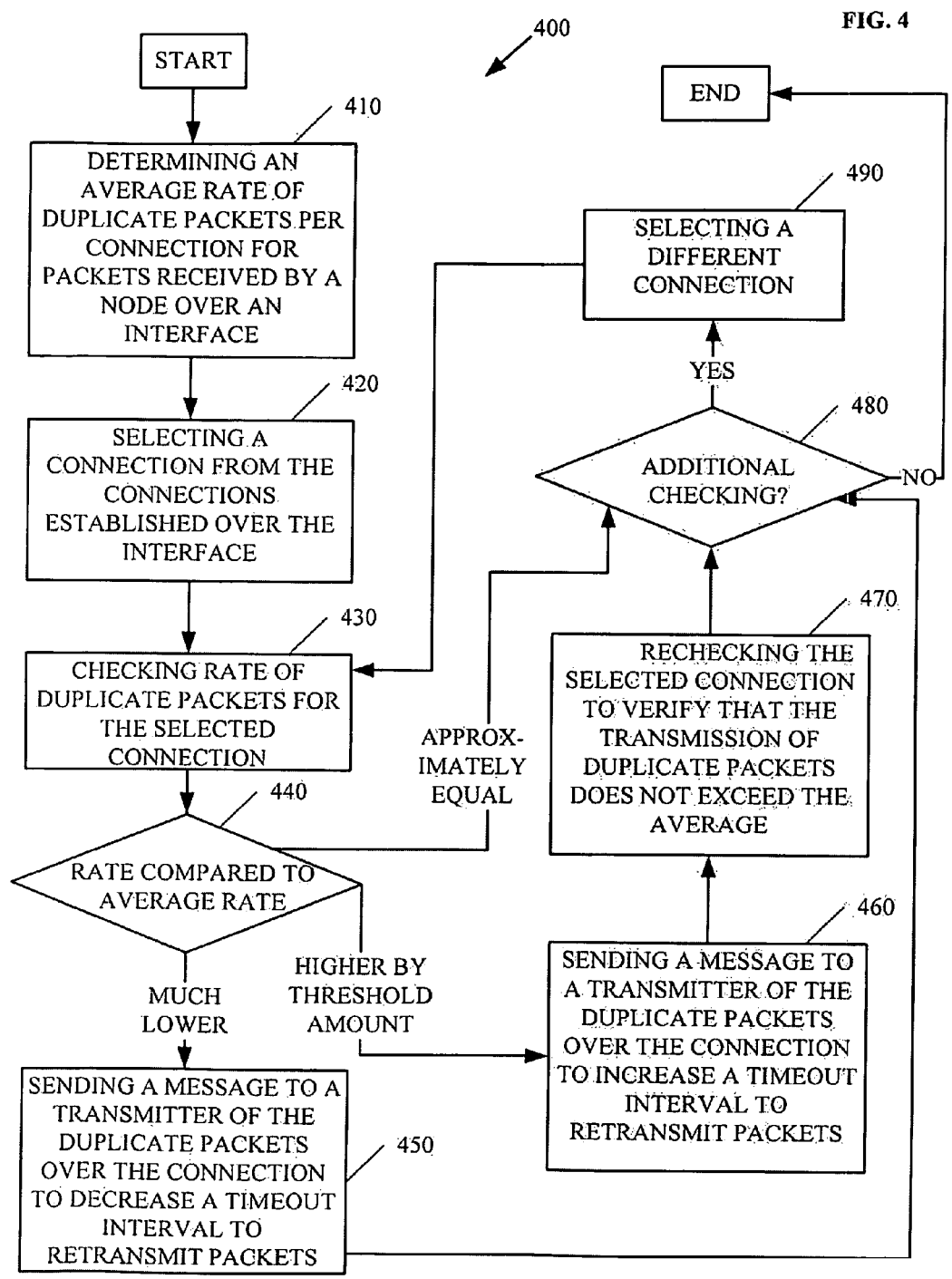
FIG. 4 sets forth a flowchart of a method of network communications in accordance with embodiments of the invention.

Turning to FIG. 4, shown is a flowchart 400 of an embodiment of a method to increase an RTO over connections with a rate of duplicate packets that exceed an average rate by a threshold percentage. The method may be performed by an apparatus such as TCP module 300 of FIG. 3. The method of flowchart 400 of FIG. 4 begins with determining an average rate of duplicate packets per connection for packets received by a node over an interface (element 410). The determination may be made by counting the number of duplicate packets for a fixed period of time, and the rate may be stated in terms of a number of duplicate packets for the fixed period of time.

The method may include selecting a connection from the connections established over the interface (element 420). The selected connection may be a connection with the worst rate of duplicates (the most over the fixed period), a connection of particular interest, or a connection from a group of connections which are to be examined in turn. The selection may be a tunable. A system administrator may be able to specify to the system how the selection is made. The method may also include checking the rate of duplicate packets for the selected connection (element 430). The rate may be compared to the average rate (element 440). If the rate of duplicate packets for the selected connection exceeds the average rate of duplicate packets by a threshold percentage, the method may include sending a message to a transmitter of the duplicate packets over the connection to increase a timeout interval to retransmit packets (element 460).

In some embodiments, the threshold percentage may be a fixed percentage, such as 10%. In other embodiments, the threshold percentage may depend upon the specific connection. Thus, it may be different for some connections than for others. In some embodiments, the threshold percentage may be a tunable. A system administrator may be able to specify the threshold value or method of determining the threshold value to the system.

In many embodiments, the receiver may send the message to increase the RTO by the same protocol as the protocol under which the packets are sent. In some further embodiments, the protocol may be amended to enable the receiver to suggest adjustments to the RTO by the sender. In other further embodiments, the sender and receiver may agree to use certain fields provided by the protocol to send a message about adjusting RTOs. The selected connection may be rechecked to verify that the transmission of duplicate packets does not exceed the average (element 470). If the rate continues to exceed the average by a threshold, another message to reduce the RTO may be sent to the sender.

Returning to element 440, if the rate of duplicate packets for the connection is significantly lower than the average rate, the receiver may send a message to the transmitter to reduce the RTO (element 450). A reduced RTO may enable the more rapid retransmission of lost packets. Finally, if the rate of duplicate packets is approximately equal to the average rate of duplicate packets, no message suggesting an adjustment of the RTO need be sent.

If there is additional checking (element 480), a different connection may be selected (element 490), and steps 430 through 470 repeated. In some embodiments, the selection of connections to be examined may, over time, include all connections from a relatively large group of connections. In other embodiments, only a limited group of connections may be checked for excessive duplicates.

The method of FIG. 4 is for illustration and not limitation. In other embodiments, multiple connections may be selected at one time for comparison of their rate of duplicate packets with the average rate of duplicate packets. In other embodiments, the comparison may be of the number of duplicate packets during some interval, rather than the rate, or may be of some other measure of the amount of duplicate packets. Other embodiments may omit a message to increase an RTO rate. In some embodiments, a receiver under a TCP connection may send a message to the transmitter to halt a fast retransmit procedure or to require the receipt of more duplicate ACKs before resending a segment. For example, the receiver may request the sender to delay resending a segment until the receiver has received four duplicate ACKs rather than 3.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for reducing retransmissions of out of order packets. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of network communications, comprising:
   determining an average rate of duplicate packets per connection for packets received by a node over an interface;
   selecting a connection from the connections established over the interface;

determining that a rate of duplicate packets for the selected connection exceeds the average rate of duplicate packets by a threshold percentage; and sending a message to a transmitter of the duplicate packets over the connection to increase a timeout interval to retransmit packets, the sending based upon determining that the rate of duplicate packets for the selected connection exceeds the average rate of duplicate packets by the threshold percentage, wherein the node sends to the transmitter an acknowledgement of packets received over the connection and the transmitter retransmits a packet of the packets when the transmitter fails to receive an acknowledgement of the packet from the node within the timeout interval.

2. The method of claim 1, further comprising:
selecting another connection;
determining that a rate of duplicate packets for the selected other connection is less than the average rate of duplicate packets; and
sending a message to the transmitter of the duplicate packets over the other connection to decrease a timeout interval to retransmit packets, the sending in response to determining that the rate of duplicate packets for the selected other connection is less than the average rate of duplicate packets.

3. The method of claim 1, wherein the selecting comprises:
determining a rate of duplicate packets for a plurality of connections; and
selecting a connection with a highest rate of duplicate packets.

4. The method of claim 1, wherein the selecting comprises:
systematically checking a group of connections over time pursuant to a plan.

5. The method of claim 1, wherein the selecting comprises selecting the previously selected connection.

6. The method of claim 1, wherein the selecting comprises selecting a connection established pursuant to a Transmission Control Protocol (TCP).

7. The method of claim 6, further comprising sending a message to the transmitter to delay the resending of packets under a fast retransmit procedure.

8. The method of claim 1, wherein the determining that the rate of duplicate packets exceeds the average rate of duplicate packets by a threshold percentage comprises determining that the rate of duplicate packets exceeds the average rate of duplicate packets by a threshold percentage tunable by a system administrator.

9. The method of claim 1, wherein the sending comprises sending a message to increase the timeout interval by an amount tunable by a system administrator.

10. The method of claim 1, wherein:
the selecting is selecting a TCP connection pursuant to a systematic checking of a plurality of wired TCP connections;
determining that the rate of duplicate packets for the selected connection per unit time exceeds the average rate of duplicate packets by a threshold percentage comprises determining that the rate of duplicate packets for the selected connection exceed the average rate of duplicate packets by 10%;
the sending comprises sending a message to double a timeout interval; and
the method further comprises rechecking the rate of duplicate packets for the selected connection to verify that the rate has decreased.

11. A computer system for network communications, the system comprising:

a processor, a computer readable memory and a computer readable storage medium;
first program instructions to select a connection from the connections established over the interface;
second program instructions to determine an average rate of duplicate packets per connection for packets received by a node over an interface and to determine that a rate of duplicate packets for the selected connection exceeds the average rate of duplicate packets by a threshold percentage; and
third program instructions to send a message to a transmitter of the duplicate packets over the connection to increase a timeout interval to retransmit packets, the sending based upon determining that the rate of duplicate packets for the selected connection exceeds the average rate of duplicate packets by the threshold percentage, wherein the third program instructions are to send to the transmitter an acknowledgement of packets received over the connection and the transmitter is to retransmit a packet of the packets when the transmitter fails to receive an acknowledgement of the packet from the sender within the timeout interval,
wherein the first, second and third program instructions are stored on the computer readable storage medium for execution by the processor via the computer readable memory.

12. The computer system of claim 11, wherein the first program instructions are to select third-generation connections.

13. The computer system of claim 11, wherein the third program instructions are to send a message to decrease the timeout interval based upon the second program instructions determining that the rate of duplicate packets for the selected connection is significantly smaller than the average rate of duplicate packets.

14. A computer program product for network communications, the computer program product comprising a non-transitory computer readable storage medium having a computer usable program code stored thereon, the computer usable program code comprising:

computer usable program code configured to determine an average rate of duplicate packets per connection for packets received by a node over an interface;
computer usable program code configured to select a connection from the connections established over the interface;
computer usable program code configured to determine that a rate of duplicate packets for the selected connection exceeds the average rate of duplicate packets by a threshold percentage; and
computer usable program code configured to send a message to a transmitter of the duplicate packets over the connection to increase a timeout interval to retransmit packets, the sending based upon determining that the rate of duplicate packets for the selected connection exceeds the average rate of duplicate packets by the threshold percentage; wherein the computer usable program code is configured to send to the transmitter an acknowledgement of packets received over the connection and the transmitter is configured to retransmit a packet of the packets when the transmitter fails to receive an acknowledgement of the packet within the timeout interval.

15. The computer program product of claim 14, the computer usable program code further comprising:
computer usable program code configured to select another connection;

computer usable program code configured to determine that a rate of duplicate packets for the selected other connection is less than the average rate of duplicate packets; and computer usable program code configured to send a message to the transmitter of the duplicate packets over the other connection to decrease a timeout interval to retransmit packets, the sending in response to determining that the rate of duplicate packets for the selected other connection is less than the average rate of duplicate packets.

16. The computer program product of claim 14, wherein the computer usable program code configured to select comprises:

computer usable program code configured to determine a rate of duplicate packets for a plurality of connections; and computer usable program code configured to select a connection with a highest rate of duplicate packets.

17. The computer program product of claim 14, wherein the computer usable program code configured to select comprises computer usable program code configured to systematically check a group of connections over time pursuant to a plan.

18. The computer program product of claim 14, wherein the computer usable program code configured to select comprises computer usable program code configured to select the previously selected connection.

19. The computer program product of claim 14, wherein the computer usable program code configured to select comprises computer usable program code configured to select a connection established pursuant to a Transmission Control Protocol (TCP).

20. The computer program product of claim 19, wherein the computer usable program code further comprises computer usable program code configured to sending a message to the transmitter to delay the resending of packets under a fast retransmit procedure.

* * * * *